United States Patent [19]

Hoshino

[11] Patent Number: 5,211,485
[45] Date of Patent: May 18, 1993

[54] FIXING STRUCTURE FOR VEHICULAR WIPER PIVOT BEARINGS

[75] Inventor: Takashi Hoshino, Isesaki, Japan

[73] Assignee: Mitsuba Electric Mfg. Co., Ltd., Gunma, Japan

[21] Appl. No.: 917,997

[22] Filed: Jul. 24, 1992

[30] Foreign Application Priority Data

Jul. 26, 1991 [JP] Japan ................................. 3-66298

[51] Int. Cl.⁵ ........................................... F16C 33/02
[52] U.S. Cl. ..................................... 384/296; 384/276
[58] Field of Search ............... 384/275, 276, 295, 296, 384/215, 222

[56] References Cited

U.S. PATENT DOCUMENTS 4,750,878  6/1988  Nix et al. .............................. 384/296
4,806,024  2/1989  Tanaka et al. ..................... 384/296 X
5,014,392  5/1991  Melara ............................. 384/296 X Primary Examiner—Thomas R. Hannon
Attorney, Agent, or Firm—Oliff & Berridge

[57] ABSTRACT

A structure for preventing movement of pivot bearings used in vehicular wiper devices, wherein a pivot shaft is rotatably supported by a sleeve mounted on a vehicle body through the intermediary of a pair of bearings at a predetermined axial spacing from each other. The pivot bearing fixing structure comprises slits formed in facing end surfaces of the bearings so as to divide the end portion of each bearing into an inner circumferential portion and an outer circumferential portion, ridges protruding inward radially from an inner surface of the inner circumferential portion of each bearing, the ridges being notched at a predetermined circumferential spacing so as to be elastically deformable radially outward, and recesses provided on an outer circumferential surface of the pivot shaft so as to receive the ridges thereby to fix the bearings against axial movement.

8 Claims, 2 Drawing Sheets

FIXING STRUCTURE FOR VEHICULAR WIPER PIVOT BEARINGS

BACKGROUND OF THE INVENTION

1. Field of the Invention

The present invention pertains to a structure for preventing movement of pivot bearings, for example, pivot bearings as used in a wiper device for vehicles such as passenger cars, buses, and trucks.

2. Description of the Related Art

As is commonly known, in this type of a wiper device, a pivot shaft, having a wiper arm integrally fixed at its base end, is rotatably supported by a sleeve fixedly mounted on a vehicle body through the intermediary of a pair of bearings opposedly placed at a predetermined axial spacing from each other.

In the above wiper device, bearings are press-fitted in the sleeve in which the pivot shaft rotatably slides with respect to the bearings. However, the press-fitted bearings may axially move to get close to each other when the press fitting between the sleeve and the bearings becomes loose due to an unacceptable allowance of the press fitting or thermal expansion and contraction caused by temperature variations. Under this circumstance, reliable supporting of both ends of the pivot shaft by the bearings will be impaired and smooth oscillation of the wiper arm is prevented due to the shaking of the pivot shaft and so on.

SUMMARY OF THE INVENTION

In view of the above described problems of the prior art, it is the aim of the present invention to provide a structure for preventing movement of pivot bearings used in a vehicular wiper device to completely overcome the above shortcomings. In a vehicular wiper device of the type having a wiper arm, a pivot shaft to which the wiper arm is integrally fixed at its base end, a sleeve stationarily mounted on the vehicle body, and a pair of bearings, which are press-fitted in the sleeve at a predetermined axial spacing from each other, rotatably supporting the pivot shaft, the pivot bearing fixing structure comprises slits formed in facing end surfaces of the bearings so as to divide the end portion of each bearing into inner circumferential portion adjacent to the pivot shaft and outer circumferential portion adjacent to the sleeve, ridges protruded inward radially from an inner surface of the inner circumferential portion of each bearing, the ridges being notched at a predetermined circumferential spacing so as to be elastically deformable radially outward, and recesses provided on an outer circumferential surface of the pivot shaft so as to receive the ridges thereby to fix the bearings against axial movement.

DESCRIPTION OF THE PREFERRED EMBODIMENTS

Figure 1:
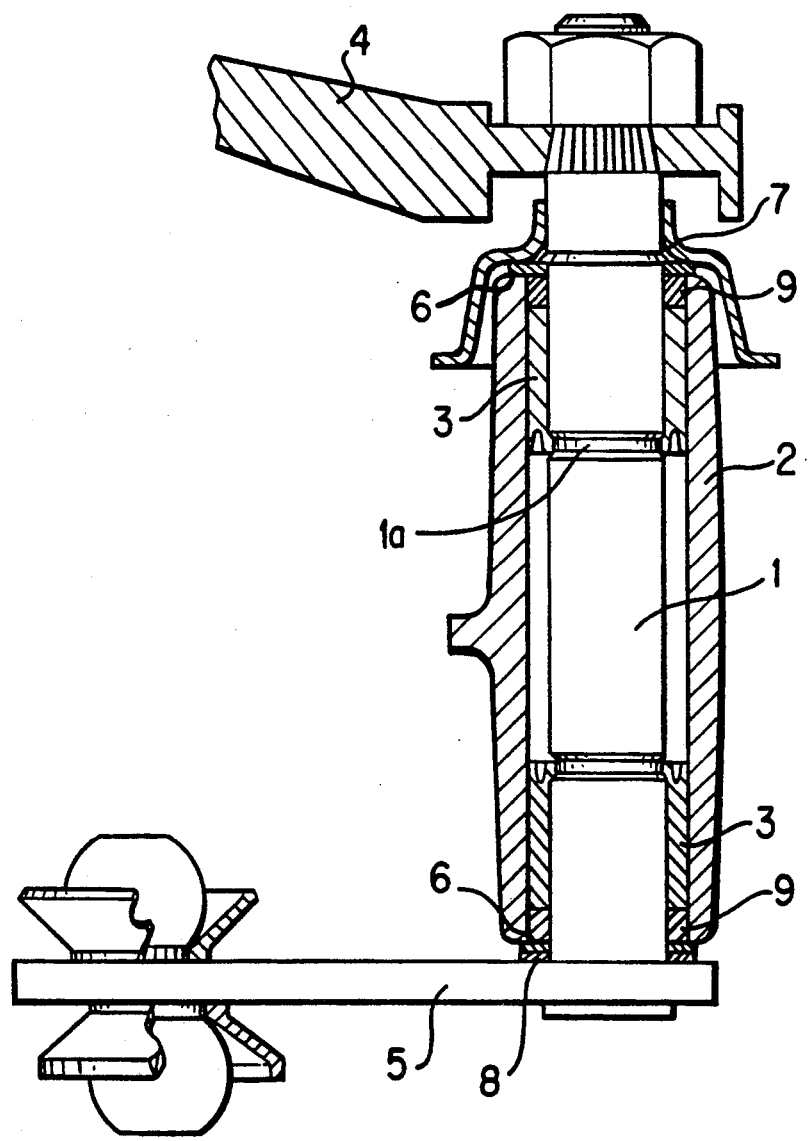
FIG. 1 is a sectional view of an assembled pivot shaft and bearing.
Figure 2:
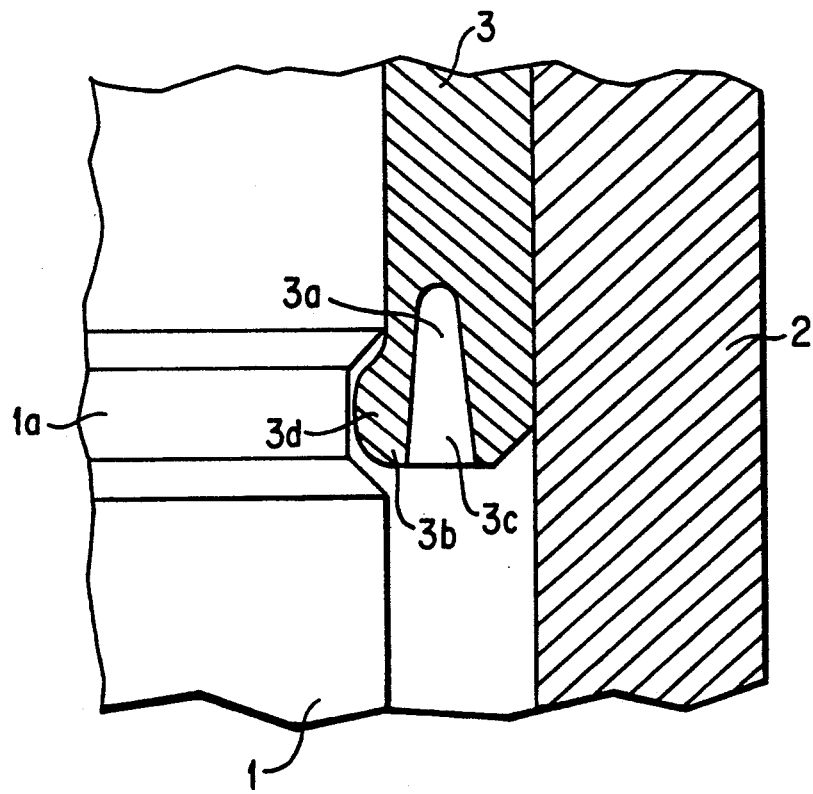
FIG. 2 is a partially enlarged sectional view of an essential part of the pivot shaft and the bearing.
Figure 3:
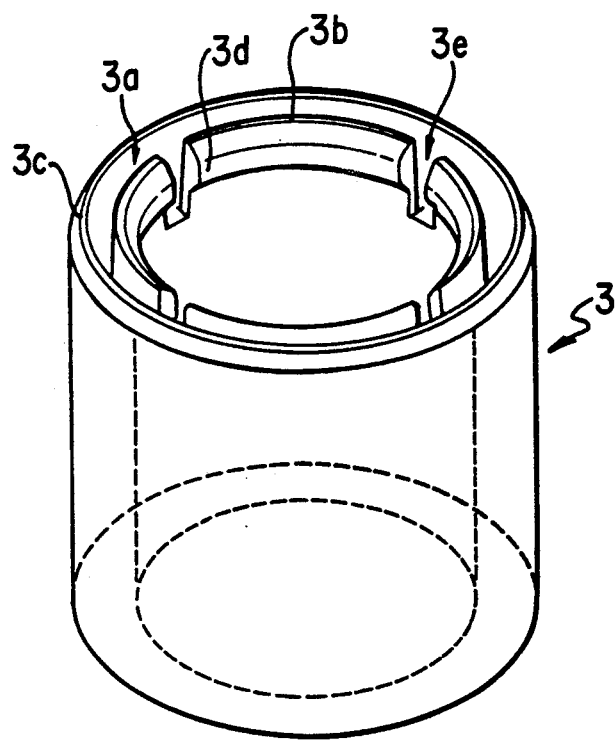
FIG. 3 is a perspective view of the bearing.

A detailed description of a preferred embodiment of the present invention will be given in conjunction with the accompanying drawings. In the appended drawings, reference number 1 is a pivot shaft for a vehicular windshield wiper device. The pivot shaft 1 is rotatably supported by a sleeve 2, which is integrally mounted on a body of a vehicle, through the intermediation of bearings 3 which will be described later. Meanwhile, an end base portion of a wiper arm 4 is integrally mounted on one end portion of the pivot shaft 1, which protrudes from the sleeve 2. On the other end portion of the pivot shaft 1, which also protrudes from the sleeve 2, an end base portion of a link arm 5 is integrally mounted being interconnected with the wiper motor (not shown). It is commonly known that windshields are wiped by the oscillation movement of the wiper arm 4 with the axial rotation of the pivot shaft 1 driven by the wiper motor.

A pair of cylindrically-shaped bearings 3 made of resin are placed along the axis of the pivot shaft 1 with a predetermined spacing to support both the top and bottom ends of the pivot shaft 1 as viewed in FIG. 1. Circumferential slits 3a are formed in each end surface of both bearings in a manner of facing each other (the lower side surface of an upper bearing and the upper end surface of a lower bearing are facing as viewed in FIG. 1). Then, each end portion of the bearings 3 is divided into an inner circumferential portion 3b facing the pivot shaft 1 side and an outer circumferential portion 3c facing the sleeve 2 side. A circular ridge 3d which protrudes inward radially is formed in each inner circumferential surface of the inner portion 3b. Furthermore, notches 3e are provided in the inner circumferential portion 3b about the bearing axis at a predetermined circumferential pitch to enable an elastic deformation of the inner circumferential portion 3b toward its outer diameter area. To rotatably support the pivot shaft 1 in the sleeve 2, the bearings 3 should be press-fitted into the sleeve in advance, then the pivot shaft 1 should be slidably inserted into the press-fitted bearings 3. When being inserted, each inner circumferential portion 3b of the bearings 3 with the slit 3a is elastically deformed toward the outer diameter area and becomes in such retracted state that the ridge 3d contacts the outer circumferential surface of the pivot shaft 1.

Also, annular recesses 1a are formed in the outer circumferential surface of the pivot shaft 1 to enable the ridges 3d of the bearings 3 to fit into recesses 1a with a clearance fitting. When the bearings 3 are located in a designed proper position against the pivot shaft 1, the ridges 3d sit in the recesses 1a but do not contact the surface of the pivot shaft 1; however, when the bearings 3 move in an axial direction of the pivot shaft 1, the ridges contact the side surface of the recesses 1a to fix against axial movement of the bearings 3. In the FIGS., reference number 6 indicates a washer; and 7, 8, and 9 indicate a stopper ring, a wave washer, and an O-ring respectively.

In the above embodiment of the present invention, the pivot shaft 1 is rotatably supported in the sleeve 2 by inserting the shaft 1 into the bearings 3 which are press-fitted into the sleeve 2 in advance. In this configuration, the ridges 3d formed in the inner circumferential surfaces of the bearings 3 fit into the recesses 1a provided in the pivot shaft 1. Therefore, the axial movement of the bearings 3 is reliably prevented even when the press fitting between the shaft 1 and the bearings 3 becomes loose caused by the unacceptable allowance of the press fitting or thermal expansion and contraction. As a result, the bearings 3 are prevented from axial movement, and both ends of the pivot shaft 1 are reliably supported by the bearings 3. Accordingly, a smooth wiping operation can be reliably obtained by a stable pivot shaft 1 in the bearings 3.

According to the present invention, the bearings 3 are reliably fixed against axial movement. Meanwhile, the ridge 3d which fits into the recess 1a of the pivot shaft 1 is formed at the inner circumferential surface of the bearing 3 which is divided into an inner and outer area by the slit 3a, and the inner circumferential portion 3b facing the pivot shaft 1 has notches 3e which are provided at a predetermined circumferential pitch about the axis to enable the inner circumferential portion 3b to be elastically deformed toward the outer diameter of the bearing 3. Thus, when the pivot shaft 1 is being inserted into the bearings 3 which have been press-fitted into the sleeve 2 in advance, the outer circumferential portion 3c of the bearing 3 is kept press-fitted in the sleeve 2 and at the same time the inner circumferential portion 3b of the bearing is elastically deformed into its outer diameter area in a retracted state in which the ridge 3d contacts the outer surface of the pivot shaft 1. Accordingly, due to the above described configuration of the bearing 3, the insertion of the pivot shaft 1 is facilitated, the axial movement of the bearings 3 is fixed or prevented, and the inserting operation of the pivot shaft 1 into the sleeve 2 will not be difficult. Furthermore, the outer circumferential portion 3c of the bearing 3 remains overlapped in a physical relationship with the inner circumferential portion 3b in the circumferential area about an axis of the shaft, then a substantially press-fitted area of the bearing 3 with the sleeve 2 will not be reduced, thus an effectiveness of the press fitting of the bearings 3 against the sleeve 2 will not be impaired.

In addition, in this structure for fixing the bearings 3 against axial movement, only the outer circumferential portion of the pivot shaft 1 is to be worked by a machine and the inner circumferential portion of the sleeve 2 need not be worked; therefore, not only will this work process become easier, but the cost of this work will be inexpensive.

In the aforementioned configuration of the present invention, the pivot shaft 1 is rotatably supported by the sleeve 2 through the intermediation of the bearings 3. In this case, the circular ridges 3d formed in the inner circumferential portions 3b of bearings 3 fit into the recesses 1a provided on the outer surface of the pivot shaft. Therefore, the axial movement of the bearings 3 is reliably prevented even when the press fitting between the shaft 1 and the bearings 3 becomes loose caused by the unacceptable allowance of the press fitting or thermal expansion and contraction. As a result, the bearings 3 are prevented from axial movement of getting closer, and both ends of the pivot shaft are reliably supported by the bearings.

Also, the ridge 3d is formed at the inner circumferential surface of the bearing 3 which is divided into an inner and outer area by the slit, and the inner circumferential portion 3b has notches 3e about the axis of the bearing 3 to enable the inner circumferential portion 3b to be elastically deformed toward the outer diameter of the bearing 3 when the pivot shaft 1 is being inserted into the bearings 3 which have been press-fitted into the sleeve in advance. Therefore, the insertion of the pivot shaft is facilitated. In addition, the outer circumferential portion 3c of the bearing 1 remains overlapped in a physical relationship with the inner circumferential portion 3b in the circumferential area about an axis of the shaft, thus a substantially press-fitted area of the bearing 3 with the sleeve 2 will not be reduced. In this structure for fixing the bearings 1 against axial movement, only the outer circumferential portion 3c of the pivot shaft 1 is to be worked by a machine and the inner circumferential portion of the sleeve 2 need not be worked; therefore, not only will this work process become easier, but it will eventually contribute to a cost reduction program.

The invention has been described with reference to the preferred embodiments thereof which are intended to be illustrative rather than limiting. Various changes and modifications may be made without departing from the spirit and scope of the invention as defined in the following claims.

What is claimed is:

1. A pivot bearing fixing structure for use in a vehicular wiper device of the type having a wiper arm, a pivot shaft to which said wiper arm is integrally fixed at its base end, a sleeve stationarily mounted on the vehicle body, and a pair of bearings press-fitted in said sleeve positioned at a predetermined axial spacing from each other, said bearings rotatably supporting said pivot shaft, said pivot bearing fixing structure comprising:

slits formed in facing end surfaces of said bearings so as to divide the end portion of each bearing into inner circumferential portion adjacent to said pivot shaft and outer circumferential portion adjacent to said sleeve;

ridges protruding inward radially from an inner surface of said inner circumferential portion of each said bearing;

recesses provided on an outer circumferential surface of said pivot shaft so as to receive said ridges thereby to fix said bearings against axial movement; and a plurality of notches formed on said inner circumferential portion of said bearing to allow said inner circumferential portion to be elastically deformable radially outward.

2. A pivot bearing fixing structure as recited in claim 1, wherein the number of said notches is four and said notches are equally spaced.

3. A pivot bearing fixing structure, comprising:

at least one bearing;

a pivot shaft supported by said at least one bearing;

a slit formed in the end surface of said at least one bearing, said slit dividing the end portion of said at least one bearing into an inner circumferential portion adjacent to said pivot shaft and an outer circumferential portion;

a ridge protruding inward radially from an inner surface of said inner circumferential portion of said at least one bearing;

at least one recess formed on an outer surface of said pivot shaft so as to receive said ridge of said at least one bearing, preventing axial movement of said at least one bearing; and a plurality of notches formed on an inner circumferential portion of said at least one bearing allowing said inner circumferential portion to be elastically deformable radially outward.

4. The pivot bearing fixing structure of claim 3, wherein the number of notches in said bearing is four and said notches are equally spaced.

5. The pivot bearing fixing structure of claim 3, wherein the number of bearings is two and the number of recesses in said pivot shaft is two.

6. The pivot bearing fixing structure of claim 3, further comprising:

a sleeve into which said bearing and said pivot shaft are inserted, said sleeve supporting said bearing and allowing said shaft to rotatably slide in relation to said bearings.

7. A pivot bearing for supporting a shaft in a sleeve, comprising:

a slit formed in the end surface of said bearing, said slit dividing the end portion of said bearing into an inner circumferential portion adjacent to said shaft and an outer circumferential portion adjacent to said sleeve;

a ridge protruding inward radially from an inner surface of said inner circumferential portion of said bearing; and a plurality of notches formed on the inner circumferential portion of said bearing to allow said inner circumferential portion to be elastically deformable radially outward.

8. The pivot bearing as recited in claim 7, wherein the number of said notches is four and said notches are equally spaced.

* * * * *